March 24, 1970    M. G. MERZ    3,502,318
SEPARABLE PRESSURE-FACE OVERLAYS FOR CLAMP JAWS
Filed July 10, 1967    3 Sheets-Sheet 2
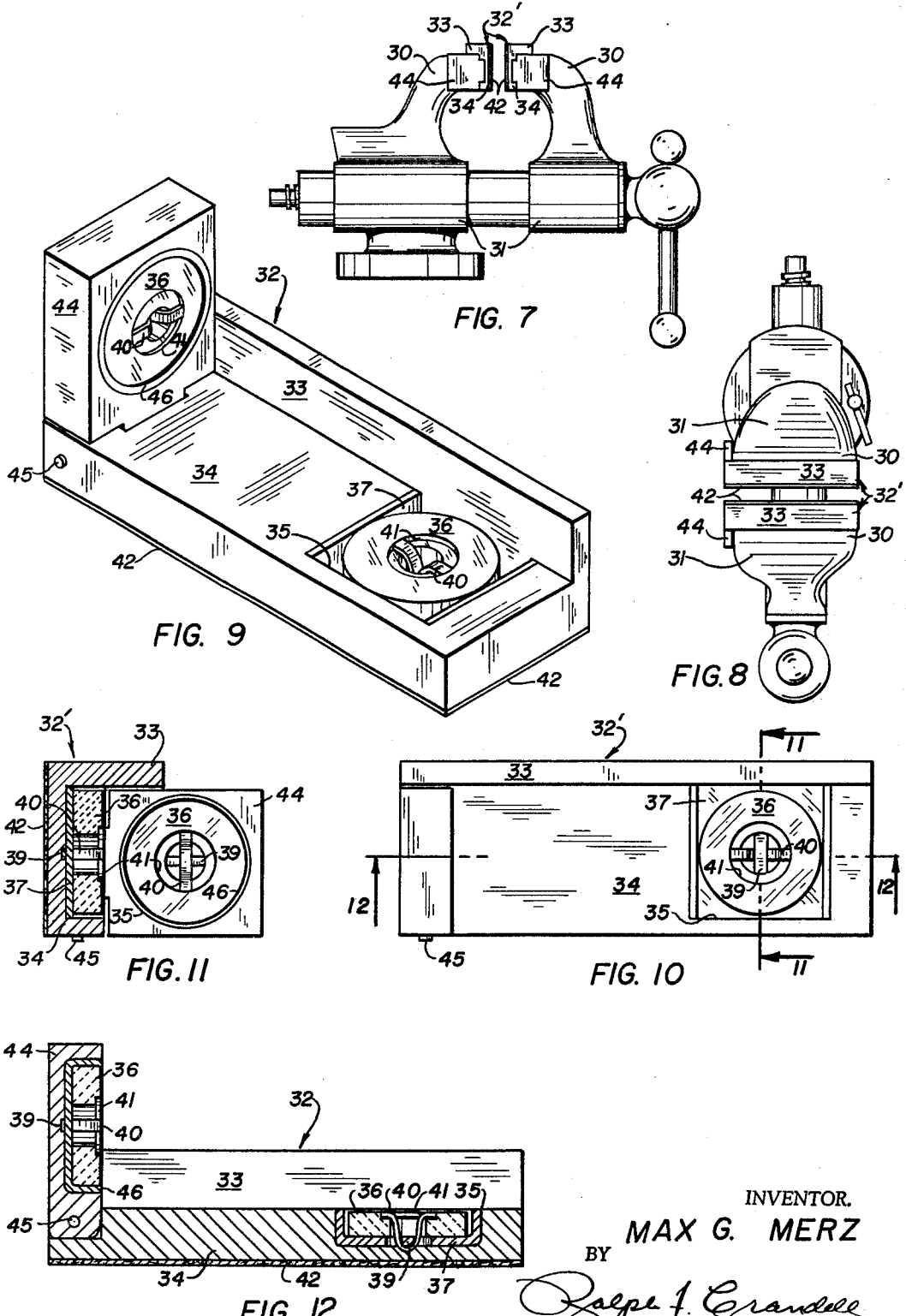
INVENTOR.
MAX G. MERZ
BY Ralph F. Crandell
ATTORNEY March 24, 1970          M. G. MERZ          3,502,318
SEPARABLE PRESSURE-FACE OVERLAYS FOR CLAMP JAWS
Filed July 10, 1967          3 Sheets-Sheet 3
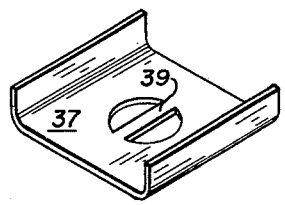
FIG. 13
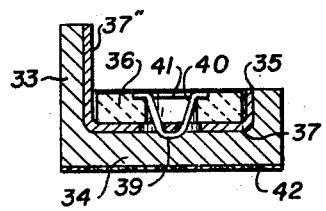
FIG. 17
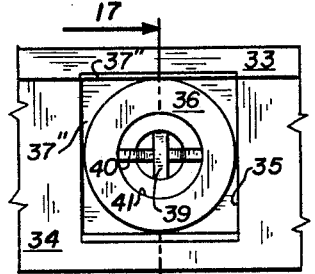
FIG. 16
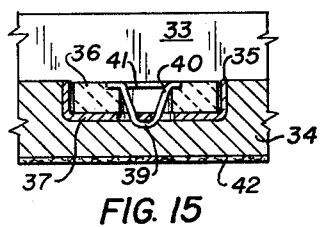
FIG. 14
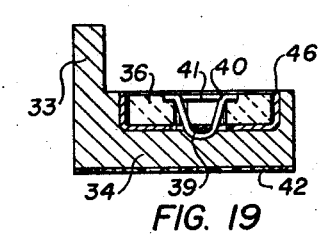
FIG. 19
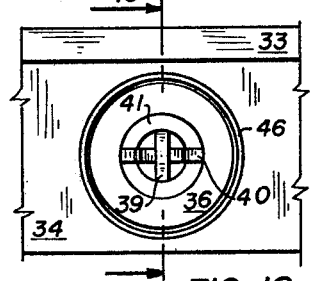
FIG. 18
FIG. 15
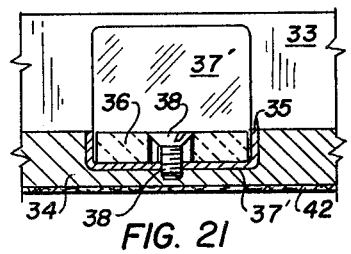
FIG. 21
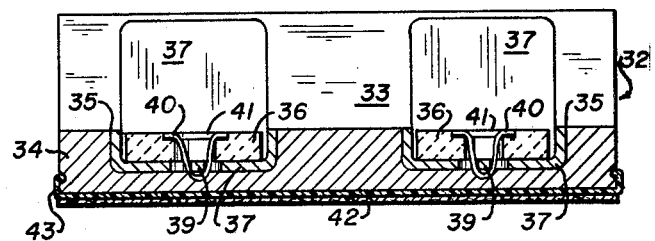
FIG. 22
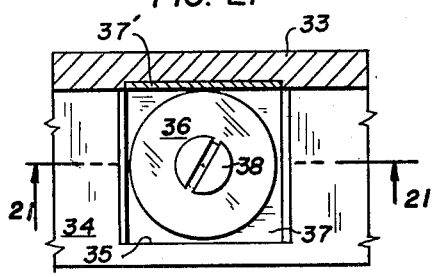
FIG. 20
INVENTOR.
MAX G. MERZ
BY
Ralph F. Crandell
ATTORNEY United States Patent Office 3,502,318
Patented Mar. 24, 1970

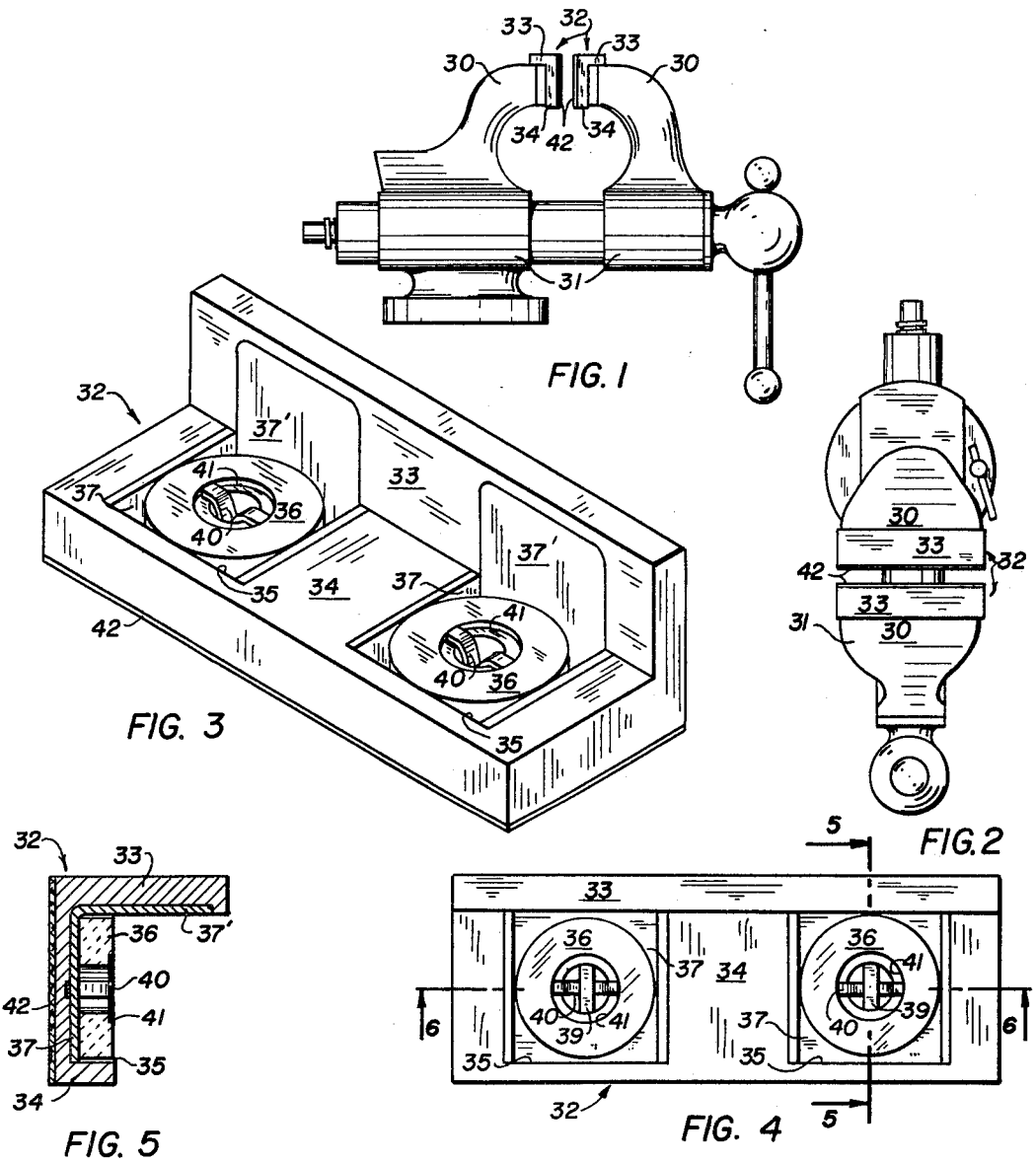
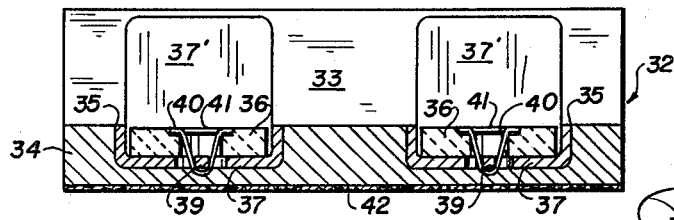

3,502,318
SEPARABLE PRESSURE-FACE OVERLAYS
FOR CLAMP JAWS
Max G. Merz, 2210 Marshall St.,
Denver, Colo. 80214
Filed July 10, 1967, Ser. No. 652,148
Int. Cl. B25b 5/16
U.S. Cl. 269—276                                8 Claims

ABSTRACT OF THE DISCLOSURE

Removable pressure-face overlays are magnetically held on the clamp jaws of a vise to protect workpieces held between the jaws. Ceramic magnets are recessed within liners of magnetically responsive material.

BACKGROUND OF THE INVENTION

This invention relates to facilities useful in selective separable application to the clamp jaws of conventional vises and analogous gripping tools to present pressure-transmitting surfaces suited for acceptable coaction with a workpiece received therebetween.

Many production, maintenance, and servicing operations require temporary and secure immobilization of a workpiece in an accessible fixed mount, such as a bench vise. Such mounts conventionally have confronting clamp jaws formed with complementary pressure faces for gripping the workpiece. As commonly available and widely employed for diverse specific purposes, such equipment is of hard, rigid, durable material, notably iron or steel. The pressure faces of the clamp jaws are frequently hatched or striated in order to enhance their frictional grip on a workpiece. As a result, the workpiece surfaces are inevitably marked, marred or defaced. Where a gripping tool is used in a repetitious production line sequence, it is feasible to condition the tool for non-damaging coaction with a succession of like workpieces. Where, however, a tool of general-purpose application, such as a conventional bench vise, is to be used with a variety of diverse workpieces of indiscriminating materials, forms, and surface finishes, it becomes desirable to adapt the tool for use with such a variety of workpieces.

OBJECTS OF THE INVENTION

The principal object of the invention is to provide novel and improved separable pressure-face overlays for the clamp jaws of conventional metal bench vises, and the like, applicable at option to present pressure-face areas of diverse specific quality.

Another object of the invention is to provide pressure-face overlays that are self-attaching and self-retaining in position of use, and which are instantly applicable to and removable from the vise without recourse to tools.

A further object of the invention is to provide novel and improved separable pressure-face overlays for the clamp jaws of conventional metal bench vises, and the like, that require no specific correlation of jaw and overlay sizes, that are amenable to economical production in an extensive range of sizes, proportions, conformations, and operative pressure-face quality, and that are susceptible of expedient production in considerable diversity of structural particularity, of important practical significance, it is an object of the invention to provide novel and improved separable pressure-face overlays for the clamp jaws of conventional metal bench vises, and the like, that are feasible of simple, inexpensive production from known and available materials and components, that are durable in long-lived, repetitious use, and that are positive and efficient in attainment of the ends for which designed.

SUMMARY OF THE INVENTION

The invention comprises a separable overlay member 32 for the clamp jaws 30 of a conventional vise 31. Each overlay member 32 is formed of non-magnetic material as a generally L-shaped member with a web 34 adapted to abut the vise jaw and a ledge 33 adapted to support the member 32 on the vise jaw. Permanent magnets 36 are recessed in the face of the web 34 abutting the vise jaw for detachably securing the member thereto. To enhance the magnetic power of the magnets, the magnet receiving pockets 35 are lined with magnetically reactive metal liners 37. The magnets 36 are recessed below the surface of the web 34, and suitable fastening means are provided to secure the magnets in the pockets. In this way, the magnets are not subject to severe compressive forces with the attendant likelihood that the relatively brittle magnets will be broken by the compressive forces exerted by the vise jaws.

DESCRIPTION OF THE DRAWINGS

FIGURE 1 is a side elevational view of a conventional bench vise equipped with typical embodiments of the invention in position of practical use.

FIGURE 2 is a top view of the arrangement shown in FIGURE 1.

FIGURE 3 is an isometric view, on a relatively-enlarged scale, of one embodiment of the invention, and illustrating those surfaces of the device adapted to abut a vise jaw.

FIGURE 4 is a bottom view of the device shown in FIGURE 3.

FIGURE 5 is a sectional view taken substantially in the plane of line 5—5 of FIGURE 4.

FIGURE 6 is a sectional view taken substantially in the plane of line 6—6 of FIGURE 4.

FIGURE 7 is an elevational view similar to FIGURE 1 showing a structural modified form of the invention in association with a conventional bench vise.

FIGURE 8 is a top view of the arrangement shown in FIGURE 7.

FIGURE 9 is an isometric view similar to FIGURE 3, of the modified form of the invention shown in FIGURES 7 and 8.

FIGURE 10 is a bottom view of the device shown in FIGURE 9.

FIGURE 11 is a sectional view taken substantially in the plane of line 11—11 of FIGURE 10.

FIGURE 12 is a sectional view taken substantially in the plane of line 12—12 of FIGURE 10.

FIGURE 13 is an isometric, detail view of a component of the embodiments of the improvement shown in FIGURES 9–12, inclusive.

FIGURE 14 is an elevational, detail view of a keeper useful in connection with the component of FIGURE 13 as represented in various views of the drawings.

FIGURE 15 is a fragmentary, detail section through a functional assembly of the component and keeper of the two preceding views as utilized in specific embodiments of the invention.

FIGURE 16 is a fragmentary, detail elevation, analogous to the right-hand portions of FIGURES 4 and 10, illustrating a structural alternative within the contemplation of the invention.

FIGURE 17 is a sectional view taken substantially in the plane of line 17—17 of FIGURE 16.

FIGURE 18 is an elevational view similar to FIGURE 16 illustrating the general utility of a structural variation specifically disclosed in FIGURES 9 and 11.

FIGURE 19 is a sectional view taken substantially in the plane of line 19—19 of FIGURE 18.

FIGURE 20 is a detail, elevational view, partially in ection, similar to the right-hand portion of FIGURE 4 showing alternative keeper means within the contemplation of the invention.

FIGURE 21 is a sectional view taken substantially in the plane of line 21—21 of FIGURE 20.

FIGURE 22 is a sectional view, similar to FIGURE 5, disclosing an association of interchangeable facing means.

DESCRIPTION OF THE PREFERRED EMBODIMENTS

One simple, practical, and preferred form of the present invention is shown in FIGURES 1-6, inclusive, as a straight, rigid, transversely-angular or L-shaped member of magnetically non-reactive material. The member is suited to overlie the salient upper corner of a metal vise jaw and present a facing of desired non-scoring quality covering the pressure face of the jaw. The member is detachably held in position by permanent magnets pocketed in the web of the member characterized by said facing. In use, a pair of such members are provided to equip the opposed jaws 30 of a conventional metal bench vise 31, or equivalent clamping device, as represented in FIGURES 1 and 2.

Referring to FIGURE 3, the overlay is an integrated unit 32, comprising a straight, rigid, elongated angle member, generally L-shaped in cross section, defining in right-angular conjunction, a ledge 33 and a web 34. The unit is formed in any suitable manner, such as by casting from metal of minimal magnetic susceptibility, such as aluminum. The angle member of the unit 32 can be produced in a wide range of sizes depending on the type and size of vise with which it is to be used. In whatever size produced, the web 34 of the angle member should be relatively thick and of an expanse adequate to substantially cover the pressure face of the vice jaw. The ledge 33 serves to engage ever the upper corner margin of the clamp jaw to suspend the web 34 in covering relation with the associated pressure face of the vice, and may be thinner and narrower than the web.

For the purpose of receiving and retaining permanent magnet elements 36, the thickness of the web 34 defines pockets 35 recessed therein through the web face overhung by the ledge 33. When mounted in the pockets 35, the magnet elements 36 are opposed to the pressure face of the juxtaposed vise jaw. In this manner, the unit 32 is securely held in place.

The magnet elements 36 are commercially available ready for inclusion in the unit 32 as relatively-thin, annular wafers or ceramic composition marketed in an assortment of sizes and particular properties under various trade designations. These magnet elements have in common the form, composition, strength, rigidity, and magnetic attributes suiting them for use in connection with the instant invention.

The pockets 35 of a given unit 32 may be of any expedient size, shape, and number appropriate for operatively housing the magnet elements 36. In general, the pockets are enlarged for the loose reception of the magnet elements 36. The pockets, and thus the magnets, may be arranged in any desired way. The pocket arrangement shown in FIGURES 3-6, inclusive, for example, provides two, like, substantially-square such pockets symmetrically interrupting the web 34 in registration at one side with the contiguous face of the ledge 33. A magnet element 36 is received and retained for attractive opposition to the pressure face of an associated vise jaw in each pocket 35. The pocket may be defined by the magnetically non-reactive metal of the web 34, but it has been established that the attractive force of the magnet elements 36 may be much enhanced through the presence of a pocket liner, or shield, 37 formed of a magnetically-responsive metal, such as iron or steel. The use of such a liner or shield has been observed to increase the attractive force by as much as twelve times that of the magnet element alone. The liner is shaped to largely, or even entirely, separate the magnet element from direct exposure to the material of the web 34.

One practical and effective arrangement for the liner 37 is shown in FIGURES 3-6, inclusive. The liner 37 comprises a shallow tray, defined by a base surmounted by parallel, low side walls. The tray is open at one end and closed at the other end by a perpendicularly-related flap 37' extending above the walls. The liner itself defines a pocket for the reception of an element 36. In use, the tray is embedded in the material of the web 34 with the flap 37' embedded in and coplanar with the ledge 33. The tray 37 is desirably and most effectively molded into the angle member when the same is cast.

However constituted and sized, the pocket 35 should freely receive and loosely embrace the associated magnet element 36 in a depth of the pocket exceeding the thickness of the element wafer. Thus the magnet element 36 is recessed within the pocket below the surface of the web 34 to obviate any possibly destructive compression of the element when the overlay is in use and is subject to the clamping pressure of the vise.

While the magnetic properties of the element 36 largely suffice to retain it recessed within the pocket of the liner 37, some means for securing the element in the pocket are desirably provided. One illustrative means for securing the magnet element 36 is shown in FIGURES 20 and 21. To this end a threaded hole centrally of the floor of the liner 37 receives the threaded end of a screw 38 extending through the central opening of the element 36. The screw head 38' overlaps the outer rim shoulder of the element 36 to hold the element 36 in place. An alternative securing means is shown in FIGURES 13-15 inclusive. The securing means there shown comprises an opening in the floor of the liner 37 defining a strut 39 in the plane of the floor across the open center of the associated element 36. A U-shaped keeper 40 of stiffly-pliant strip material, typified by FIGURE 14, is looped about said strut and extends through the element 36. By bending the free ends of the keeper 40 outwardly within a shallow annular rabbet 41 on the exposed end of the element 36, the element is detachably retained in the liner 37.

In order to prevent the marking, marring or damaging of the workpiece surface, the unit 32 is completed for its intended uses and purposes by covering the surface of the web 34 with a suitable workpiece engaging protective cover. To this end, the plane, smooth, pressure face surface of the web 34 may simply be polished to present the non-abrasive material of its composition for grip against relatively-harder workpiece material; alternately, the said web surface may be selectively coated with adhered sheet laminations 42 of a texture and quality appropriate for a particular application; or the margin of said web surface may be worked for detachable snap coaction with the beaded edge of a separable protective overlay sheet 43, as shown in FIGURE 22.

The structural variation of the invention shown in FIGURES 7-12, inclusive, is an integrated unit 32' similar to and incorporating many of the features of the unit 32 described above. The unit 32' comprises a straight angle member, L-shaped in cross section, formed of magnetically non-reactive material and presenting the ledge 33, and web 34 as hereinabove described. The modified unit 32' utilizes a single magnet element 36 pocketed in association with a magnetically-reactive tray 37, of the type shown in FIGURE 13, in and near one end of the web 34. At the opposite end of the web 34 the unit 32' is formed with an abutment extending transversely of the angle member for engagement with one side of the vise jaw. This abutment comprises a block 44 of the magnetically non-reactive material, having a thickness approximating that of the web 34, and linked to the end of said web for limited swinging movement by means of a pintle 45 perpendicular to the ledge 33 in the plane of the web. The block is thus hinged to said web for slight relative oscillations under the overhang of the ledge and in position for self-adjusting engagement with the end of a clamp jaw 30 mounting the unit 32', as shown in FIGURES 7 and 8.

For purposes of engaging the vise jaw, the block 44 is provided with a pocket and pocket liner for receiving a magnet element 36. In one illustrative form, the pocket may be in the form of a shallow circular cup 46 in substitution for the tray 37 as described above. Thus organized and furnished with a facing 42 as above set forth, the unit 32' is applicable to coaction with a clamp jaw in the same way and for the same purposes as attended use of the unit 32. One significant operative difference, however, being a self-adjustment of the unit 32' on and in adaptions to irregularities of clamp jaw.

Other options are available for the design and production of functionally equivalent embodiments of the invention. FIGURE 15 signifies a use of the tray 37 lacking the flap 37' in acceptable substitution for the arrangement including said flap; FIGURES 16 and 17 exemplify a modification of the tray 37, designated 37", wherein the tray sides are unequal in extension away from the tray floor, and the tray is pocketed with its said sides parallel to the ledge 33 wherein the longer of the sides is embedded in simulation of the disposition of the flap 37' previously shown and described; and FIGURES 18 and 19 typify the interchangeability of the trays 37 and 37" with the cup 46 in any and all locations and mountings of the magnet elements 36.

Predicated upon the advent of the inexpensive, high-power annular, ceramic permanent magnet wafers and enhancement of their potency through association with pocket-lining shields of magnetically-reactive metal, the concept ingeniously developed as above detailed evolves as a novel facility of high utility, convenience, and unique practical merit.

Since changes, variations, and modifications in the form, particular construction, and specific arrangement of the elements shown and described may be had without departing from the spirit of the invention, I wish to be understood as being limited solely by the scope of the appended claims, rather than by any details of the illustrative showing and foregoing description.

I claim as my invention:

1. A separable pressure face overlay for conventional metal clamp jaws having in common a planer pressure face and an upper corner boundary therealong, said overlay comprising a rigid angle member formed from magnetically non-reactive material and defining a ledge engageable over the upper corner of the clamp jaw and a relatively thicker web disposable to overlie in substantial covering relation with the pressure face of the clamp jaw; said web being provided with spaced pockets opening towards the pressure face of the associated clamp jaw, each said pocket being substantially lined with a magnetically-reactive liner; a relatively thin permanent magnet individually affixed within and for detachment from each said lined pocket in exposed, non-contacting opposition to the pressure face of the clamp jaw; said permanent magnets and said magnetically-reactive liners coacting in response to engagement of said member with a clamp jaw to releaseably immobilize and retain said angle member in operative attachment to the jaw; and the web of said angle member having a clamp surface parallel to the pressure face of the jaw and suited for non-damaging coaction of a workpiece when said angle member is disposed in operative engagement with the clamp jaw.

2. A separable pressure face overlay according to claim 1, wherein said pockets are rectangular defining floor and wall areas, and said magnetically-reactive liners each comprise a shallow tray conformably lining the floor and some of the wall areas of each said rectangular pocket.

3. A separable pressure face overlay according to claim 2, wherein each said shallow tray liner includes a perpendicularly related flap extending therefrom and recessed into said ledge.

4. A separable pressure face overlaying according to claim 1, wherein said pockets are substantially circular, said magnetically-reactive liners each comprise a shallow cup conformably lining each said pocket, and said permanent magnets are substantially annular in shape.

5. A separable pressure face overlay according to claim 1, including an abutment block of a thickness similar to said web, and means hinging said block to one end of said web for limited adjustment beneath said ledge about an axis perpendicular to said ledge and in a disposition suited to abut an end of the clamp jaw, said block being provided with a pocket opening towards a contiguous surface area of the associated clamp jaw, said pocket being substantially lined with a magnetically-reactive liner, and a relatively thin permanent magnet affixed within and for detachment from said lined pocket in exposed non-contacting opposition to said contiguous surface of the clamp jaw.

6. A separable pressure face overlay according to claim 1, wherein said permanent magnets are annular, and including means for removably retaining each said permanent magnet for limited floating movement within its associated lined pocket.

7. A separable pressure face overlay according to claim 6, wherein each said annular permanent magnet is removably secured within its associated pocket by a headed screw entered centrally through said magnet into threaded engagement with the liner in said pocket.

8. A separable pressure face overlay according to claim 6, wherein each said annular permanent magnet is removably secured within its associated pocket by a keeper outstanding from attachment to the associated pocket liner and extending centrally through said magnet into holding engagement therewith.

References Cited

UNITED STATES PATENTS 3,065,960    11/1962    Miller _____ 269—276

FOREIGN PATENTS 254,039    8/1964    Australia.

OTHELL M. SIMPSON, Primary Examiner

DAVID R. MELTON, Assistant Examiner